United States Patent
Takami et al.

(10) Patent No.: US 7,350,603 B2
(45) Date of Patent: Apr. 1, 2008

(54) HYBRID DRIVE UNIT AND VEHICLE MOUNTED THEREWITH

(75) Inventors: Shigeki Takami, Anjo (JP); Kiyotomo Miura, Anjo (JP); Satoru Wakuta, Anjo (JP); Kazuhisa Ozaki, Anjo (JP)

(73) Assignees: Aisin AW Co., Ltd., Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 427 days.

(21) Appl. No.: 10/994,363

(22) Filed: Nov. 23, 2004

(65) Prior Publication Data
US 2005/0115750 A1 Jun. 2, 2005

(30) Foreign Application Priority Data
Dec. 2, 2003 (JP) ............................. 2003-403667

(51) Int. Cl.
*B60K 6/04* (2006.01)
(52) U.S. Cl. ................... 180/65.2; 180/233; 903/925
(58) Field of Classification Search ............... 180/65.1, 180/65.2, 233, 299, 377, 382; 903/925, 952
See application file for complete search history.

(56) References Cited

U.S. PATENT DOCUMENTS

| | | | |
|---|---|---|---|
| 3,623,568 A | | 11/1971 | Mori |
| 5,174,541 A | * | 12/1992 | Hutter et al. ............... 248/636 |
| 5,291,966 A | * | 3/1994 | Kato ........................... 180/292 |
| 5,934,395 A | * | 8/1999 | Koide et al. ............... 180/65.2 |
| 5,935,035 A | * | 8/1999 | Schmidt ......................... 475/5 |
| 6,415,884 B1 | * | 7/2002 | Hawener et al. ............ 180/291 |
| 6,464,608 B2 | * | 10/2002 | Bowen et al. .................. 475/5 |
| 6,655,488 B2 | * | 12/2003 | Braud ......................... 180/233 |
| 7,140,461 B2 | * | 11/2006 | Morrow ..................... 180/65.2 |

FOREIGN PATENT DOCUMENTS

| | | |
|---|---|---|
| JP | 47-31773 | 8/1972 |
| JP | 10-2241 A | 1/1998 |
| JP | 2004-193627 A | 7/2004 |

* cited by examiner

*Primary Examiner*—Christopher P. Ellis
*Assistant Examiner*—Brian Swenson
(74) *Attorney, Agent, or Firm*—Sughrue Mion, PLLC

(57) ABSTRACT

A hybrid drive unit includes a hybrid mechanism having at least one electric motor and a transfer that distributes driving force to front and rear wheels. The electric motor and the transfer are housed in a tubular shaped transmission case that extends in the front and rear directions of a vehicle. The hybrid drive unit is mounted on and supported by a second attachment coupled to an internal combustion engine and provided at a front end of the hybrid drive unit and a first attachment portion fixed to a vehicle body. The electric motor and the transfer that are heavy structural members of the hybrid drive unit are positioned separately to the front and rear of the first attachment portion that forms a boundary. By adopting this configuration, it is possible to reduce the amount of engine vibration that is transmitted to the vehicle body through the first attachment portion.

10 Claims, 2 Drawing Sheets

HYBRID DRIVE UNIT AND VEHICLE MOUNTED THEREWITH

BACKGROUND OF THE INVENTION

The disclosure of Japanese Patent Application No. 2003-403667 filed on Dec. 2, 2003, including the specification, drawings and abstract is incorporated herein by reference in its entirety.

1. Field of the Invention

The invention relates to a hybrid drive unit that can be mounted in a vehicle, and a vehicle in which this hybrid drive unit is mounted. More particularly, the invention relates to a hybrid drive unit having a transfer that distributes driving force to front and rear wheels of a vehicle, and a vehicle provided with the same hybrid drive unit.

2. Description of the Related Art

A front-engine rear-drive (FR) hybrid vehicle includes a hybrid drive unit which is mounted to the rear of the engine and which acts as a transmission.

The hybrid drive unit includes a tubular shaped transmission case (case member) that extends in a front-rear direction, as well as an input shaft, an output shaft, and a hybrid mechanism that are housed within the transmission case. A driving force that is transmitted to the input shaft from an internal combustion engine is changed by the hybrid mechanism and then transmitted to the output shaft. The driving force is then transmitted from the output shaft to the rear wheels via a differential.

When the above described hybrid drive unit is applied to a four-wheel drive vehicle (refer, for example, to Japanese Patent Laid-Open No. Hei. 10-2241), a transfer is provided in the transmission case and the driving force is transmitted to the output shaft via the hybrid mechanism. The transfer functions so as to distribute the driving force to the front and rear wheels.

The above described hybrid drive unit houses both the hybrid mechanism and the transfer within the transmission case, and the utilized hybrid mechanism has at least one electric motor. The electric motor and the transfer are comparatively heavy structural members among the structural members included within the hybrid drive unit (hereinafter referred to as "heavy structural members").

The above described hybrid drive unit may be mounted such that a second mounting portion at a front end of the transmission case is fixed to the internal combustion engine and a first mounting portion at a rear end of the transmission case is fixed to a vehicle body. As a result, the heavy structural members, namely, the electric motor and the transfer, are positioned between the first and the second mounting portions. However, if this configuration is adopted, resonance is generated by the frequency of vibrations caused by the explosion strokes of the internal combustion engine overlapping with the frequency of bending vibration of the overall hybrid drive unit. Accordingly, the vibrations are amplified and transmitted to the vehicle body, whereby the driver's drive feeling is detrimentally affected.

SUMMARY OF THE INVENTION

It is an aspect of the invention to provide a hybrid drive unit that can improve the driver's drive feeling. In this hybrid drive unit, a mounting portion is provided between a hybrid mechanism and a transfer so that heavy structural members of the hybrid drive unit are positioned to front and rear sides of the mounting portion. Accordingly, the mounting portion is aligned with a nodal point of the bending vibration of the overall hybrid drive unit, and thus, vibration caused by the explosion stokes of the internal combustion engine is transmitted less easily to the vehicle body via the mounting portion.

According to a first aspect of the invention, a hybrid drive unit is provided with a hybrid mechanism and a transfer. The hybrid mechanism includes at least one electric motor that is a heavy structural member of the hybrid drive unit, and furthermore, the transfer itself is also a heavy structural member. The electric motor and the transfer are positioned separately to the front and rear of a first mounting portion, thereby making it possible to align the first mounting portion with a nodal point of bending vibration of the overall hybrid drive unit. By adopting this configuration, it is possible to inhibit vibration caused by explosion strokes of an internal combustion engine from being transmitted to a vehicle body through the first mounting portion. Accordingly, the driver's driving feeling is improved.

Moreover, according to a second aspect of the invention, a speed change unit is positioned in a forward direction from the first mounting portion, and the electric motor which is a heavy structural member is positioned further in the forward direction from the speed change unit. As a result of adopting this configuration, it is possible to further reduce the amount of vibration of the internal combustion engine that is transmitted to the vehicle body through the first mounting portion.

Further, according to a third aspect of the invention, the hybrid mechanism is more specifically configured to include a first electric motor for generating electric power that is one of the electric motors, a force distribution planetary gear, a second electric motor for driving force assistance that is another of the electric motors, and the speed change unit. These four members are positioned in the above order, namely, the first electric motor, the force distribution planetary gear, the second electric motor, the speed change unit, in the rearward direction from the internal combustion engine.

In addition, according to a fourth aspect of the invention, the hybrid drive unit is more specifically configured such that the first electric motor, the force distribution planetary gear, the second electric motor, the speed change unit and the transfer are coaxially aligned.

Moreover, according to a fifth aspect of the invention, the hybrid drive unit is more specifically configured such that the first electric motor, the force distribution planetary gear, the second electric motor, the speed change unit and the transfer are positioned in that order in the rearward direction from the internal combustion engine.

Note that, the third to fifth aspects of the invention are able to realize the same effect as that of the first aspect.

According to a sixth aspect of the invention, it is possible to reduce the amount of vibration of an internal combustion engine that is transmitted to a vehicle body of an automobile through a hybrid drive unit.

DETAILED DESCRIPTION OF THE EXEMPLARY EMBODIMENTS

Hereinafter a first embodiment of the invention will be explained with reference to the drawings.

First Embodiment

Figure 1:
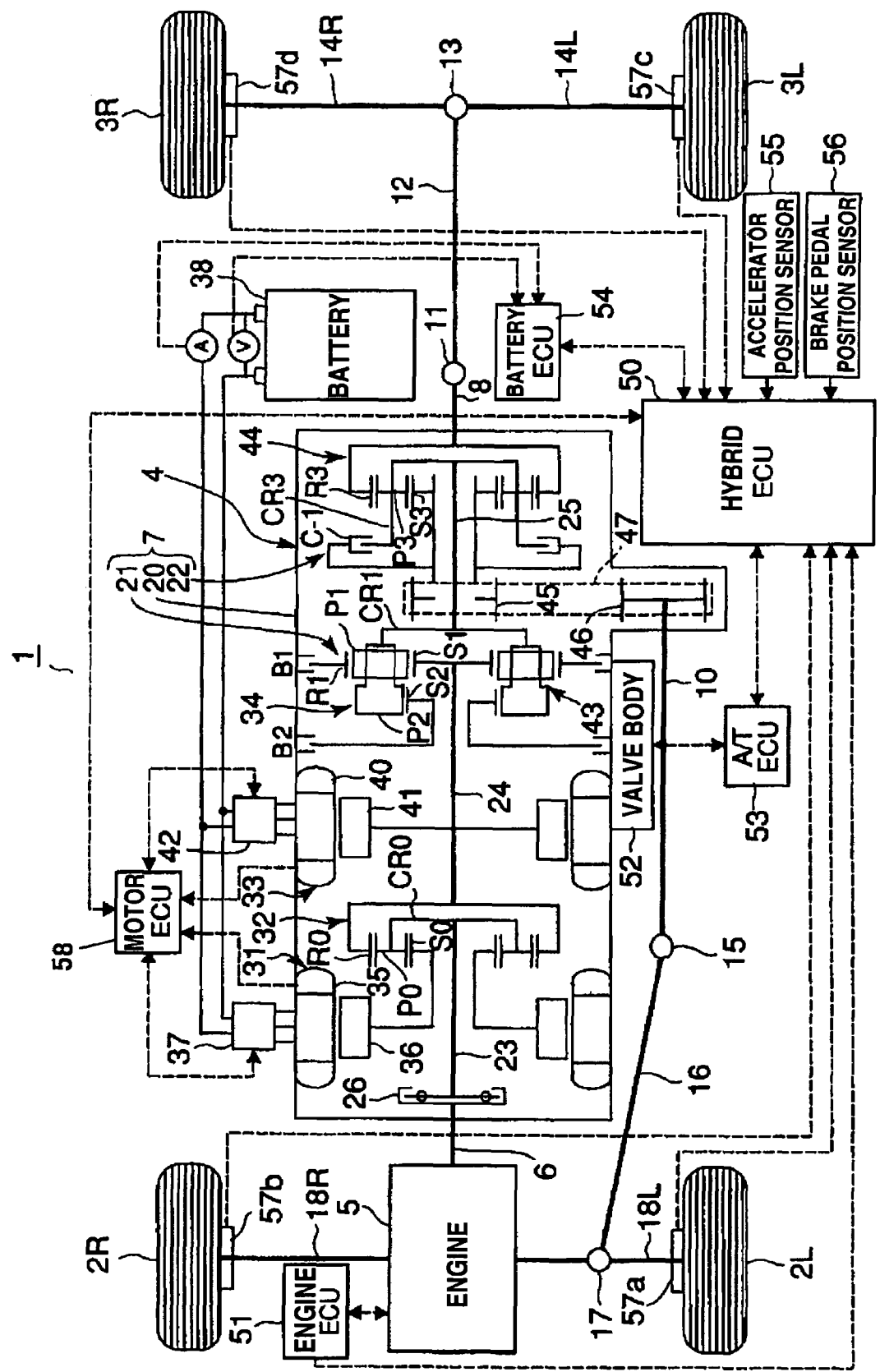
FIG. 1 is a skeleton diagram of a hybrid drive unit according to a first embodiment.

FIG. 1 shows an example of a vehicle according to the invention, and, more specifically, shows a vehicle 1 in which a hybrid drive unit according to the invention is mounted. The illustrated vehicle 1 is a four-wheel drive vehicle, and is shown, in FIG. 1, in a figure that combines a skeleton figure of the hybrid drive unit with a schematic outline view of the vehicle 1 when viewed from above. Note that, if the vehicle 1 was an actual vehicle, the end of the vehicle 1 at the left-hand side of FIG. 1 would be the front, and the end of the vehicle 1 at the right-hand side would be the rear. Further, in this specification, the front and rear, the top and bottom, and the left and right of the hybrid drive unit are defined based on the position in which the hybrid drive unit is mounted in a body 4 of the vehicle 1.

First, an outline of the configuration and the operation of the vehicle 1 will be explained with reference to FIG. 1.

As shown in FIG. 1 the body 4 of the vehicle 1 is supported by left and right front wheels 2L and 2R, and left and right rear wheels 3L and 3R. An internal combustion engine 5 is fixed to a front portion of the body 4 by rubber mounts (not shown) such that a crank shaft 6 thereof faces in a front-rear direction. Note that, in FIG. 1, the crank shaft 6 is indicated as just an engine output shaft which is the portion of the crank shaft 6 that protrudes outwardly in the rearward direction from the engine 5. A hybrid drive unit 7, which acts as a transmission, is connected to the rear end of the internal combustion engine 5. In this embodiment, the hybrid drive unit 7 has two output shafts which protrude therefrom, namely, a rear wheel drive shaft 8 that protrudes in the rearward direction, and a front wheel drive shaft 10 that protrudes in the forward direction. Among these, the rear wheel drive shaft 8 extends in the rearward direction from the rear end of the hybrid drive unit 7, and is coupled to a differential 13 via a flexible coupling 11 and a propeller shaft 12. The differential 13 is coupled to the left and right rear wheels 3L and 3R respectively via a left drive axle 14L and a right drive axle 14R. On the other hand, the front wheel drive shaft 10 extends in the forward direction from a radial-side protruding portion provided at a rear portion of the hybrid drive unit 7, and is coupled to a differential 17 via a flexible coupling 15 and a propeller shaft 16. The differential 17 is coupled to the left and right front wheels 2L and 2R respectively via a left drive axle 18L and a right drive axle 18R.

With the vehicle 1 having the above described configuration, driving force generated by the internal combustion engine 5 is input to the hybrid drive unit 7 via the crank shaft 6. Then, the driving force is changed by a hybrid mechanism 21 (described hereinafter) of the hybrid drive unit 7, and the changed driving force is distributed as necessary to the front and rear wheel sides by a transfer 22 (described hereinafter) of the hybrid drive unit 7. More specifically, among the total driving force output from the hybrid drive unit 7, the driving force that is transmitted to the rear wheel side is transmitted to the rear wheels 3L and 3R via the rear wheel drive shaft 8, the flexible coupling 11, and propeller shaft 12, the differential 13 and the respective left and right drive axles 14L and 14R. On the other hand, the driving force transmitted to the front side is transmitted to the front wheels 2L and 2R via the front wheel drive shaft 10, the flexible coupling 15, the propeller shaft 16, the differential 17, and the left and right drive axles 18L and 18R.

Next, the hybrid drive unit 7 according to the invention will be described in more detail. The hybrid drive unit 7 includes: a transmission case (case member) 20 that is formed with a long tubular shape and which extends in the front-rear direction; the hybrid mechanism 21 that is housed within the transmission case 20; the transfer 22 that is also housed within the transmission case 20; an input shaft 23; an intermediate shaft 24; and an output shaft 25. The input shaft 23, the intermediate shaft 24, and the output shaft 25 are positioned coaxially in that order and pass through the respective centers of the hybrid mechanism 21 and the transfer 22 in the front-rear direction. Among these shafts 23, 24 and 25, the input shaft 23 is connected to the crank shaft 6 via a damper unit 26. Note that, in a broad sense, the intermediate shaft 24 is an output shaft.

The hybrid mechanism 21 includes, in an order from a front side (namely, the internal combustion engine 5 side) thereof, a first electric motor 31, a force distribution planetary gear 32, a second electric motor 33, and a speed change unit 34. The first two of these structural members, namely, the first electric motor 31 and the force distribution planetary gear 32 are disposed so as to be coaxial with the input shaft 23, and the latter two, namely, the second electric motor 33 and the speed change unit 34 are disposed so as to be coaxial with the intermediate shaft 24. Note that, the input shaft 23 is coaxial with the intermediate shaft 24.

The first electric motor 31 has a stator 35 and a rotor 36. The stator 35 is fixed to the transmission case 20 (refer to FIG. 2) and the rotor 36 is supported so as to be capable of rotation at an "internal diameter side" of the stator 35. Note that, within the explanation hereinafter, the sides of the transmission case 20 in the diameter direction will be defined with respect to the input shaft 23. Accordingly, the side close to the input shaft 23 is referred to as the "internal diameter side", and the side far therefrom as an "external diameter side". The rotor 36 of the first electric motor 31 is coupled to a sun gear S0 of the force distribution planetary gear 32, described hereinafter. The primary function of the described first electric motor 31 is to generate electric power based on input of power via the sun gear S0, and the first electric motor 31 (a) drives the second electric motor 33 via an inverter 37 and (b) recharges a hybrid vehicle drive battery (hereinafter referred to as "HV battery) 38 . This first electric motor 31 is a heavy structural member among the structural members of the hybrid drive unit 7.

The force distribution planetary gear 32 is configured from a single pinion planetary gear that is disposed so as to be coaxial with the input shaft 23. This force distribution planetary gear 32 includes a carrier CR0 that supports a plurality of pinions P0; and the sun gear S0 and a ring gear R0 that are respectively meshed with the pinions P0. The carrier CR0 of the force distribution planetary gear 32 is coupled to the input shaft 23, and the sun gear S0 is coupled to the rotor 36 of the first electric motor 31. Further, the ring gear R0 is coupled to the intermediate shaft 24. The described force distribution planetary gear 32 distributes power that is input to the carrier CR0 via the input shaft 23 to (i) the first electric motor 31 side via the sun gear S0 and to (ii) the intermediate shaft 24 side via the ring gear R0, based on rotational control of the first electric motor 31. Note that, the power distributed to the first electric motor 31 is used for electricity generation, while the power distributed to the intermediate shaft 24 is utilized for drive of the vehicle 1.

The second electric motor 33 includes a stator 40 and a rotor 41. The stator 40 is fixed to the transmission case 20 and the rotor 41 is supported so as to be capable of rotation at an internal diameter side of the stator 40. The rotor 41 of the second electric motor 33 is coupled via the intermediate shaft 24 to a sun gear S1 of the speed change unit 34, described hereinafter. This second electric motor 33, like the first electric motor 31, is connected to the HV battery 38 via the inverter 42. However, the primary function of the second electric motor 33 is different to that of the first electric motor 31. More specifically, the second electric motor 33 is not primarily used for electricity generation like the first electric motor 31, but instead has a central role as a drive motor for power assistance of the power, namely, the driving force, of the vehicle 1. However, the second electric motor 33 also functions as a generator during breaking, and regenerates inertia force of the vehicle 1 as electric energy. The second electric motor 33 is another heavy structural member among the structural members of the hybrid drive unit 7.

The speed change unit 34 includes: a Ravigneaux planetary gear unit 43 configured from a double pinion planetary gear and a single pinion planetary gear that share a long pinion P2; a first brake B1; and a second brake B2.

Among the above described members, the planetary gear unit 43 is configured from two sun gears, namely, the sun gear S1 and a sun gear S2; a carrier CR1 that supports a pinion P1 and the shared long pinion P2; and a ring gear R1. The two pinions P1 and P2 are meshed with each other, the pinion P1 is meshed with sun gear S1 and the ring gear R1, while the long pinion P2 is meshed with the sun gear S2. The ring gear R1 of the planetary gear unit 43 is coupled to the first brake B1, and the sun gear S2 is coupled to the second brake B2. The sun gear S1 that acts as an input member of the overall speed change unit 34 is connected via the intermediate shaft 24 to (i) the ring gear R0 of the force distribution planetary gear 32 and (ii) the rotor 41 of the second electric motor 33. Moreover, the carrier CR1 that acts as an output member for the overall speed change unit 34 is coupled to the output shaft 25. The speed change unit 34, as will be described later, is capable of selectively engaging one of the first and second brakes B1 and B2 while releasing the other so as to switch between two reduction speeds that have different reduction gear ratios. More specifically, the speed change unit 34 is able to change the magnitude of the driving force input from the intermediate shaft 24, and then transmits the changed driving force to the output shaft 25 via the carrier CR1.

The above described hybrid mechanism 21 is housed within the transmission case 20. The transfer 22 is also disposed within the transmission case 20 to the rear of the hybrid mechanism 21.

The transfer 22 includes a single pinion planetary gear 44; a clutch C-1 that acts as a differential limiting device; a drive gear 45; a driven gear 46; and a belt 47 that is wrapped around the gears 45 and 46. The single pinion planetary gear 44 has a carrier CR3 that supports a plurality of pinions P3; and a sun gear S3 and a ring gear R3 that respectively mesh with the pinions P3. The carrier CR3 of the single pinion planetary gear 44 is coupled to the output shaft 25, and the ring gear R3 thereof is coupled to the rear wheel drive shaft 8. Further, the sun gear S3 of the single pinion planetary gear 44 is coupled to the drive gear 45, and the carrier CR3 and the sun gear S3 are connected to each other via the clutch C-1. The driven gear 46 is coupled to the previously described front wheel drive shaft 10.

The transfer 22 with the above described configuration distributes driving force transmitted from the output shaft 25 as necessary to the front wheels 2L and 2R and the rear wheels 3L and 3R. More specifically, when the clutch C-1 is engaged, the sun gear S3, the carrier CR3 and the ring gear R3 rotate as an integral unit, whereby the output shaft 25, the rear wheel drive shaft 8, and the front wheel drive shaft 10 rotate at the same speed. However, it is possible to suitably adjust the driving force that is transmitted to the rear and the front wheels in accordance with the running state of the vehicle by appropriately controlling the engagement state of the clutch C-1. The transfer 22 is another heavy structural member among the structural member of the hybrid drive unit 7.

The overall operation of the vehicle 1 in which the hybrid drive unit 7 is mounted is controlled by a hybrid ECU (hybrid control unit) 50. This hybrid ECU 50 is connected to an engine ECU 51, an automatic transmission (A/T) ECU 53, a battery ECU 54, and a motor ECU 58. The ECU 51 controls the internal combustion engine 5; the A/T ECU 53 controls valves within a valve body 52 attached to a lower portion of the transmission case 20 (refer to FIG. 2); the battery ECU 54 controls the battery 38; and the motor ECU 58 controls the first and second electric motors 37 and 42. Moreover, the hybrid ECU 50 receives respective detection signals from (i) an accelerator pedal position sensor 55 that detects a position of an accelerator pedal, not shown, (ii) a brake pedal position sensor 56 that detects a position of a brake pedal, not shown, and (iii) rotation sensors 57$a$, 57$b$, 57$c$, and 57$d$ that detect rotations of the respective wheels 2L, 2R, 3L and 3R.

Figure 2:
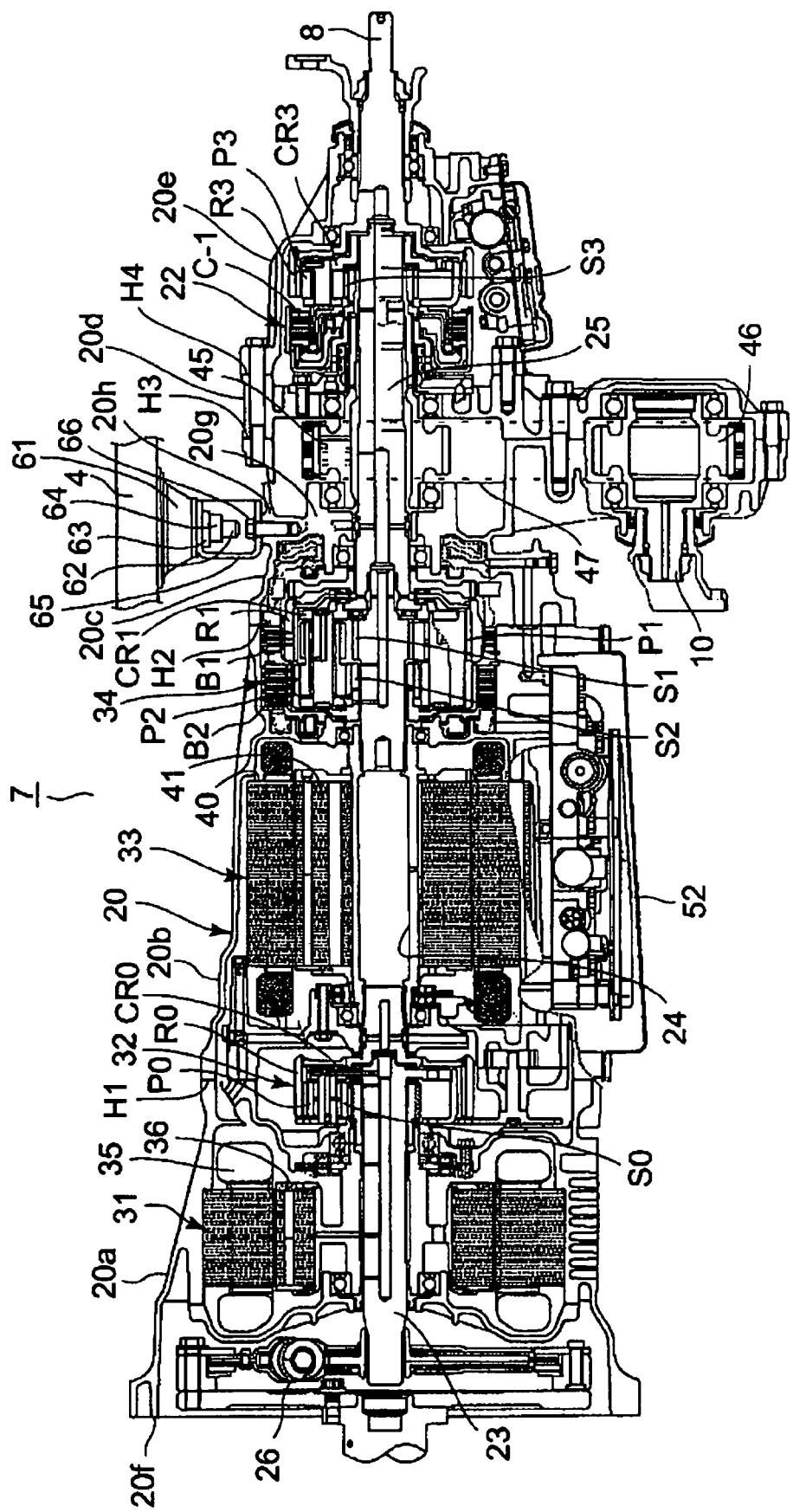
FIG. 2 is a longitudinal section figure of the hybrid drive unit according to the first embodiment.

FIG. 2 shows a longitudinal section figure of the hybrid drive unit 7. As can be seen from FIG. 2, the first electric motor 31, the power distribution planetary gear 32, the second electric motor 33, the speed change unit 34, and the transfer 22 are disposed in that order within the substantially cylindrical transmission case 20 from the engine 5 side thereof, namely, the front side (the left-hand side in FIG. 2). As was described previously, among these structural members, the first electric motor 31, the second electric motor 33 and the transfer 22 are heavy structural members that are heavy as compared to the power distribution planetary gear 32 and the speed change unit 34.

The transmission case 20 that houses the above structural members is divided into five separate cases in the front-rear direction. More specifically, the transmission case 20 is divided, in order from the front side thereof, into a first section case 20$a$, a second section case 20$b$, a third section case 20$c$, a fourth section case 20$d$, and a fifth section case 20$e$. Four contacting surfaces H1, H2, H3 and H4 respectively connect these section cases 20$a$ to 20$e$. The first section case 20$a$ which is the section case closest to the front side substantially houses the input shaft 23, the first electric motor 31, and the power distribution planetary gear 32. Further, the next section case, namely, the second section case 20$b$ substantially houses the intermediate shaft 24, the second electric motor 33, and the speed change unit 34. Finally, the third, the fourth and the fifth section cases 20$c$, 20$d$ and 20$e$ house the transfer 22.

The overall hybrid drive unit 7 as described above is configured such that its dimension in the front-rear direction is longer than its dimensions in the up-down and left-right directions. The hybrid drive unit 7 is mounted in the vehicle 1 so as to be supported by mounts at two points, namely, a point at the front side of the transmission case 20, and a point at the rear side thereof. More specifically, a second attachment portion 20$f$ which is connected to the rear end of the internal combustion engine 5 is formed at the front end of the transmission case 20, namely, at the front end of the first section case 20a. This second attachment portion 20f configures a second mounting portion that connects between the transmission case 20 and the rear end of the internal combustion engine 5. In addition, a partition 20g that extends in the diameter direction is provided at a generally central position in the front-rear direction of the third section case 20c that is positioned to the rear side of the transmission case 20. A first attachment portion 20h is formed in a part of an upper portion of this partition 20g. The first attachment portion 20h is supported by the body 4. Accordingly, the overall transmission case 20 is rubber mounted to a part of the body 4 by the first attachment portion 20h formed in the third section case 20c. More particularly, a rubber seat 61 is provided on the body 4, and the stator 65 is fixed to this rubber seat 61 by a bolt 62, a washer 63, and a nut 64. Moreover, the third section case 20c is attached to the stator 65 by a bolt 66 that is screwed into the first attachment portion 20h. It should be noted that, following attachment, the size of the gap between the bolt 62 on the body 4 side and the bolt 66 on the transmission case 20c side is less than the insertion length (screw-in length) of the bolt 66. Thus, even in the unlikely event that the bolt 66 was to become loose, the bolt 66 would not drop out from the first attachment portion 20h. Accordingly, there is no possibility that the rear end side of the transmission case 20 will become detached from the body 4.

The first attachment portion 20h is disposed at a position in the front-rear direction that is generally in the rear portion of the overall transmission case 20. If this first attachment portion 20h is considered to be a boundary, the hybrid mechanism 21 is positioned to the front side thereof, and the transfer 22 is positioned to the rear side. Accordingly, among the three heavy structural members of the hybrid drive unit 7 (namely, the first electric motor 31, the second electric motor 33 and the transfer 22), the first and second electric motors 31 and 33 are positioned to the front side of the first attachment portion 20h, while the transfer 22 is positioned to the rear side thereof. In other words, when the first attachment portion 20h is considered to be a boundary, the heavy structural members are divided up so as to be positioned to the front and rear sides thereof. As a result, it is possible to substantially align the nodal point of the natural vibration of the overall hybrid drive unit 7 with the first attachment portion 20h. This alignment makes it possible to reduce the amount of vibration of the internal combustion engine 5 that is transmitted to the body 4 via the first attachment portion 20h, whereby driving feeling is improved.

Moreover, according to the embodiment of the invention, the speed change unit 34 is positioned between the electric motor (the second electric motor) 33 and the first attachment portion 20h. Accordingly, the electric motor 33 that is a heavy structural member is positioned away from the first attachment portion 20h, and, to this extent, it is possible to reduce the vibrations of the internal combustion engine 5 that are transmitted to the vehicle body via the first attachment portion 20h.

According to the above described embodiment, the hybrid mechanism 21 includes four main structural members, namely, the first electric motor 31, the power distribution planetary gear 32, the second electric motor 33, and the speed change unit 34, that are positioned in that order from the front side (the internal combustion engine 5 side) of the transmission case 20. However, the invention is not limited to this configuration. As long as (i) at least one of the first electric motor 31 and the second electric motor 33 which are both heavy structural members, and (ii) the transfer 22 which is also a heavy structural member are divided up so as to be positioned respectively to the front and rear of the first attachment portion 20h (the first mounting portion) that is taken to be a reference point, the other structural members of the hybrid mechanism 21 may be disposed at any chosen positions in the front-rear direction.

Moreover, in the above description, the speed change unit 34 is described as being a unit that changes the speed of the total output obtained from the engine output and the electric motor output. However, the invention is not limited to using this type of unit, and, for example, a speed change unit may be adopted that changes the speed of the electric motor output and then add the engine output thereto.

Further, the hybrid drive unit 7 need not necessarily be provided with the speed change unit 34 at all, and if necessary, the hybrid drive unit 7 may be provided with a torque converter.

In addition, the above embodiment describes one example of a hybrid mechanism, namely, a hybrid mechanism using a split-power configuration. However, the hybrid mechanism according to the invention is not limited to this type. So long as at least one electric motor is provided, the invention is not restricted to having a split-power configuration, and may adopt, for example, a parallel hybrid configuration or a series hybrid configuration.

Moreover, in the above description, as an example of the positional division of the hybrid mechanism and the transfer, the hybrid mechanism 21 is positioned to the front side of the first attachment portion 20h that is taken to be a boundary, and all of the structural members of the transfer 22 (namely, the single pinion planetary gear 44, the clutch C-1, the drive gear 45, the driven gear 46, and the belt 47) are positioned to the rear side. However, the invention is in no way limited to this positional division. So long as the hybrid mechanism 21 is positioned to the front side of the boundary, namely, the front side of the first attachment portion 20h, it is sufficient if the transfer is positioned such that the center of gravity thereof is to the rear side of the first attachment portion 20h.

What is claimed is:

1. A hybrid drive unit comprising:
an input shaft which is positioned to a rear of an internal combustion engine and which extends in front-rear directions of a vehicle;
an output shaft that is coaxially aligned with the input shaft;
a hybrid mechanism including at least one electric motor, the hybrid mechanism changing a driving force transmitted from the internal combustion engine to the input shaft and then transmitting the driving force to the output shaft;
a transfer that distributes the driving force of the output shaft to front and rear wheels; and
a case member that houses the input shaft, the output shaft, the hybrid mechanism and the transfer that are positioned to the rear of the internal combustion engine, the case member comprising:
(i) a shaft that is connected to the internal combustion engine; and
(ii) a first attachment portion which configures a first mounting portion between a vehicle body and the case member and which is provided between the at least one electric motor and the transfer, wherein
the at least one electric motor and the transfer are respectively positioned to a front and a rear of the first mounting portion, the hybrid mechanism includes a speed change unit which is positioned further in the rear direction from the at least one electric motor and which changes the driving force, the first attachment portion is provided between the speed change unit and the transfer, the hybrid mechanism comprises a first electric motor for generating electric power that is one of the at least one electric motor, a force distribution planetary gear, a second electric motor for driving force assistance that is another of the at least one electric motor, and the speed change unit, and the first electric motor, the force distribution planetary gear, the second electric motor and the speed change unit are positioned in that order in the rear direction from the internal combustion engine.

2. The hybrid drive unit according to claim 1, wherein the first electric motor, the force distribution planetary gear, the second electric motor, the speed change unit and the transfer are coaxially aligned.

3. The hybrid drive unit according to claim 2, wherein the first electric motor, the force distribution planetary gear, the second electric motor, the speed change unit and the transfer are positioned in that order in the rear direction from the internal combustion engine.

4. A vehicle comprising the hybrid drive unit according to claim 3 mounted to said vehicle, and an internal combustion engine, the hybrid drive unit further comprising a second attachment portion that configures a second mounting portion that supports the internal combustion engine, wherein the hybrid drive unit is any one of a plurality of hybrid drive units, and the hybrid drive unit is mounted in the vehicle using the first attachment portion and the second attachment portion.

5. A vehicle comprising the hybrid drive unit according to claim 2 mounted to said vehicle, and an internal combustion engine, the hybrid drive unit further comprising a second attachment portion that configures a second mounting portion that supports the internal combustion engine, wherein the hybrid drive unit is any one of a plurality of hybrid drive units, and the hybrid drive unit is mounted in the vehicle using the first attachment portion and the second attachment portion.

6. A vehicle comprising the hybrid drive unit according to claim 1 mounted to said vehicle, and an internal combustion engine, the hybrid drive unit further comprising a second attachment portion that configures a second mounting portion that supports the internal combustion engine, wherein the hybrid drive unit is any one of a plurality of hybrid drive units, and the hybrid drive unit is mounted in the vehicle using the first attachment portion and the second attachment portion.

7. A vehicle comprising the hybrid drive unit according to claim 1 mounted to said vehicle, and an internal combustion engine, the hybrid drive unit further comprising a second attachment portion that configures a second mounting portion that supports the internal combustion engine, wherein the hybrid drive unit is any one of a plurality of hybrid drive units, and the hybrid drive unit is mounted in the vehicle using the first attachment portion and the second attachment portion.

8. A vehicle comprising the hybrid drive unit according to claim 1 mounted to said vehicle, and an internal combustion engine, the hybrid drive unit further comprising a second attachment portion that configures a second mounting portion that supports the internal combustion engine, wherein the hybrid drive unit is any one of a plurality of hybrid drive units, and the hybrid drive unit is mounted in the vehicle using the first attachment portion and the second attachment portion.

9. The hybrid drive unit according to claim 1, wherein the at least one electric motor and the transfer are relatively heavy structural members of the hybrid drive unit.

10. The hybrid drive unit according to claim 9, wherein the at least one electric motor and the transfer are heavier than a power distribution planetary gear and a speed change unit.

* * * * *